United States Patent [19]

McDonald

[11] Patent Number: 4,920,949

[45] Date of Patent: May 1, 1990

[54] PAPER FUELED COOKER

[76] Inventor: Norman J. McDonald, Box 155, Hendrix, Okla. 74741

[21] Appl. No.: 348,886

[22] Filed: May 8, 1989

[51] Int. Cl.$^5$ ............................................. A47J 37/00
[52] U.S. Cl. ................................ 126/25 R; 126/9 R; 126/15 R
[58] Field of Search ................ 126/25 R, 222, 110 B, 126/9 R, 15 R

[56] References Cited

U.S. PATENT DOCUMENTS

| | | | |
|---|---|---|---|
| 2,161,669 | 6/1939 | Freeman | 126/29 |
| 2,511,515 | 6/1950 | Schmitt . | |
| 2,806,463 | 9/1957 | Smith . | |
| 3,199,503 | 8/1965 | Hanson . | |
| 3,306,280 | 2/1967 | Vannoy . | |
| 3,380,444 | 4/1968 | Stalker . | |
| 3,395,691 | 8/1968 | Skarsten . | |
| 3,438,364 | 4/1969 | Galloway, Jr. . | |
| 3,477,360 | 11/1969 | Raney . | |
| 3,599,624 | 8/1971 | Gehring | 126/25 R |
| 4,328,783 | 5/1982 | Martenson | 126/25 R |
| 4,635,610 | 1/1987 | Nakanishi | 126/15 R X |

OTHER PUBLICATIONS

"Barboca" Advertising Sheet, Reuter, Inc., 410, 11th Ave. S., Hopkins, Minn., 55343, (no date).

Primary Examiner—Larry Jones
Attorney, Agent, or Firm—Robert E. Breidenthal

[57] ABSTRACT

A cooker that can be fueled by the oxidation of a number of sheets of newspaper wadded together. The cooker includes a rectangular bottom wall that is horizontal, impervious and supported by legs depending from its corners. The bottom wall together with upstanding side walls, front and rear walls integrally joined at its peripheral edges define an open topped housing. The upper edges of the front and rear walls support a removable grill basket of two hingedly connecting parts for holding food with a sheet of aluminum foil inserted in the basket therebelow, such sheet being of a size substantially to close the open upper end of the cooker. The side walls have heights exceeding the top of a supported basket to constitute wind shields. Hoods are affixed to the outside upper margins of the front and rear walls that have air communication with the interior of the housing through such margins to constitute a convective air inlet for supporting oxidation at the bottom of the housing.

12 Claims, 2 Drawing Sheets

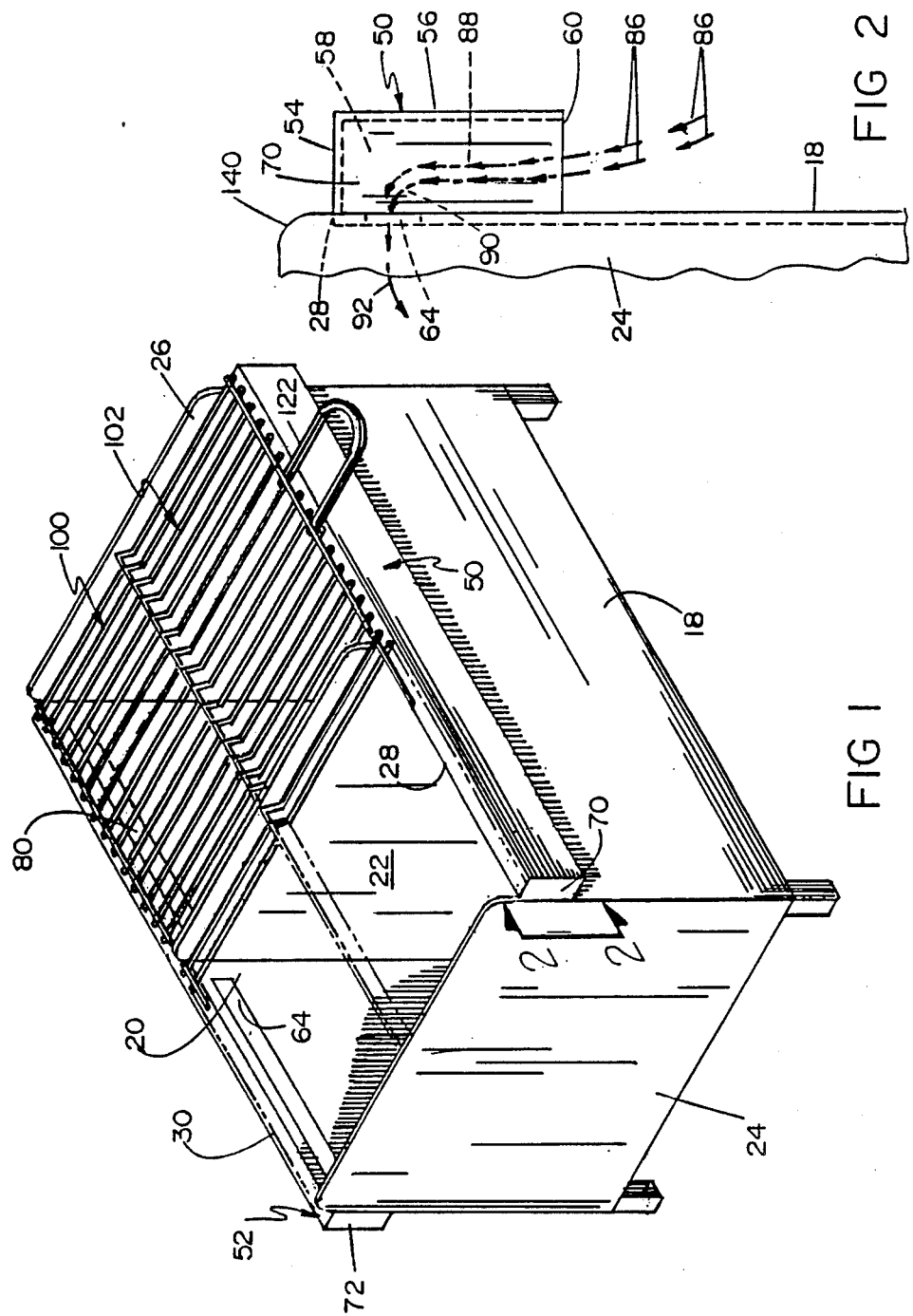

U.S. Patent May 1, 1990 Sheet 2 of 2 4,920,949
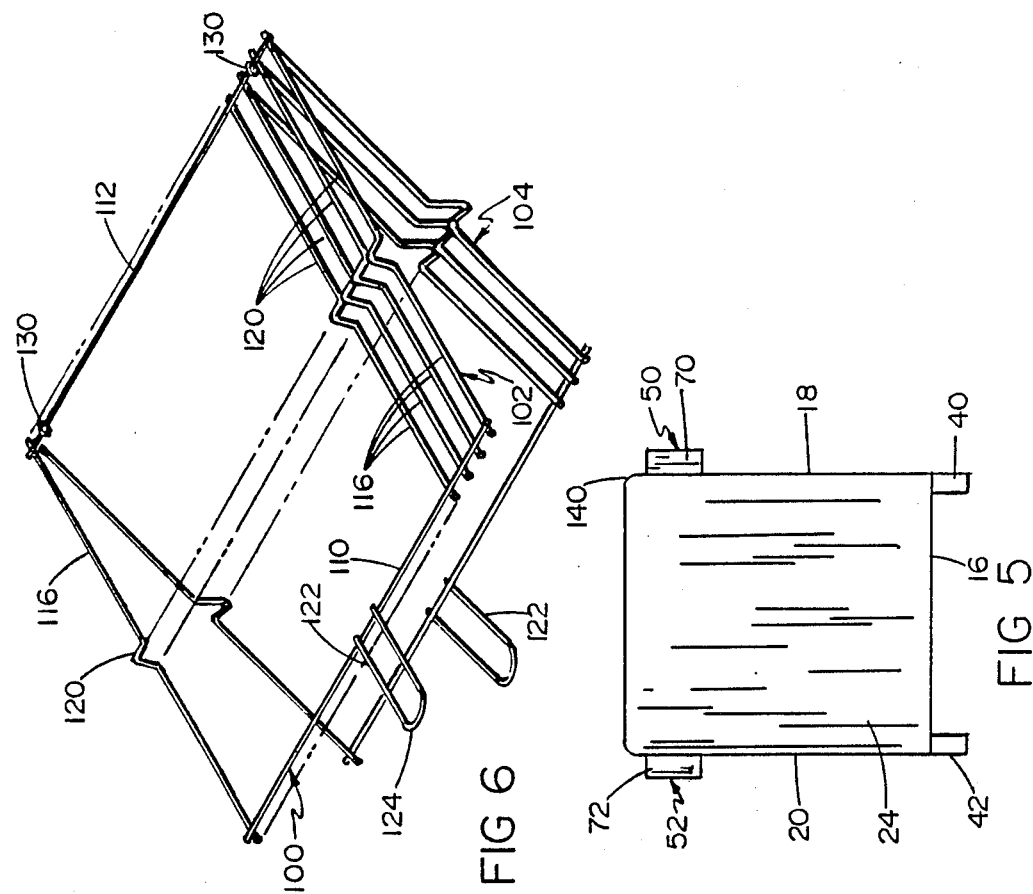
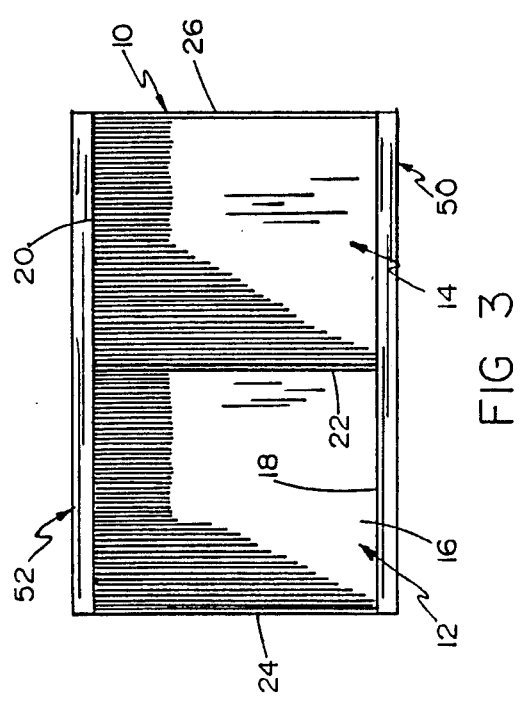
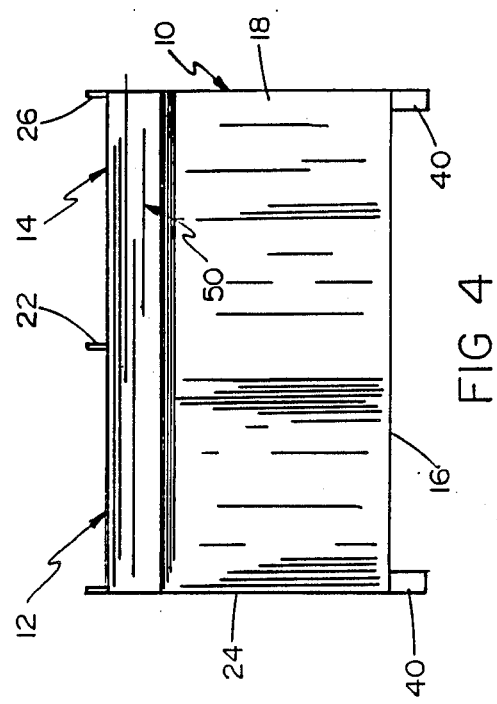

1

PAPER FUELED COOKER

BACKGROUND OF THE INVENTION

1. Field of the Invention

The present invention relates to new and useful improvements in cooking equipment, and more particularly pertains to highly efficient apparatus of such character that can be fueled through a cooking cycle with a small quantity of wadded newspaper or the like.

2. Description of Related Art

A cooker bearing the trademark BARBOCA was marketed in the past for a limited period of time by Reuter, Inc. which was then located at 410 11th Ave. S., Hopkins, Minn. 55343. Such cooker involved an open-topped rectangular housing provided with retractable legs. A two-part hinged wire food basket provided with outwardly extending handles that are juxtaposed when the basket is closed is removably supported on the housing when cooking, the basket being substantially coextensive with the open top of the housing. Each of the vertical walls of the cooker is constituted of spaced inner and outer walls, the innermost being of heat resistant, asbestos fire board insulation, and the outermost being of sheet steel. The front and rear vertical walls are provided adjacent their upper and lower edges with horizontally spaced air openings through the outer steel walls or shells only for the purpose of inducing convection through the hollow interiors to cool the outer front and rear steel walls. The side walls are each provided adjacent their upper edges with elongated horizontal slots. Such slots are defined by aligned apertures through both the fire board and the sheet steel. The slots are for the purpose providing air intakes.

Other proposals have been made for various types of heaters that employ wadded sheets of newspaper for fuel, but none of knowledge are remotely as pertinent to the subject invention as the cooker briefly described above.

SUMMARY OF THE INVENTION

The paramount object of the invention is to provide a cooker of simple, durable, and inexpensive construction that is reliable in operation out of doors, even under at least moderately windy conditions, to cook meat, and which can be fueled through a complete cooking cycle with a few sheets of wadded newspaper.

Another object of the invention is to provide a cooker in accordance with the paramount object such that ignition is easily and readily effected, and in which cooking temperatures are speedily attained and maintained, without environmentally objectionable production of smoke and noxious effluvium damaging to the ecology, as well as misproportionate quantities of carbon dioxide to minimize contributing excessively to the so-called greenhouse effect, and wherein hazards such as inherent in the use of so-called charcoal starters and other flammable liquids (which may include lead and invite the extremely deleterious consequences thereof).

Yet another and very important object of the invention is to provide a cooker in accordance with the above objects such that heat passing by conduction through a vertical wall of the cooker from the heated interior thereof that will induce ambient air to flow by convection up the outside of such wall to cool the latter by conduction and thence to flow into the upper interior of the cooker to thence descend downwardly within the cooker by convection toward an oxidation zone in the bottom of the cooker for sustaining such oxidation and the production of resultant heating of the interior of the cooker.

A final and very important object of the invention to be specifically enumerated is to provide a cooker in accordance with the foregoing objects such that the same has an open top and which will support a removable food holder at the top of the cooker that is nearly coextensive with the horizontal extend of the open top of the cooker and wherein the cooker affords wind shields for the food holder by the provision of diametrically opposed upstanding wind shields of greater height than the food holder that are disposed at positions bounding the open top of the cooker.

Broadly the invention involves an open-topped, generally rectangular cooker comprising a housing constituted of a horizontal and imperforate bottom wall having parallel front and rear edges, vertical front and rear walls integral with and extending upwardly from the front and rear edges of the bottom wall, said front and rear walls being of substantially equal height and having horizontal upper edges, parallelly spaced vertical side walls integral with and extending upwardly from the bottom wall, said side walls being normal to and having front and rear vertical edges respectively integral with the front and rear walls, respectively, each of said side walls being imperforate and having a height substantially greater than the front and rear walls, front and rear air intake hoods fixed to and extending horizontally along outer sides of the upper marginal portions of the front and rear walls, each of said hoods being comprised of an upper hood wall integral with and projecting outwardly from its respective housing wall, with the upper hood wall terminating in a depending hood wall that is spaced from its respective housing wall to define a convection air space therebetween, said air space being closed at its top by the upper hood wall and having free communication with air ambient to the cooker at its bottom, each of said air spaces having air communication with an upper interior portion of the cooker by an air passageway means extending through its respective housing wall at a height greater than the lowermost extent of the depending hood wall, the arrangement being such that when the interior of the cooker is hot, air will flow upward by convection along the outside of the heated front and rear walls to enter the front and rear hoods, and thence enter the cooker through the passageway means to thereafter descend by convection within the cooker, and said upper edges of the front and rear walls being adapted to support a food support structure, with upper marginal portions of the side walls functioning as wind shields therefor.

BRIEF DESCRIPTION OF THE DRAWINGS

Other objects, features and advantages of the invention will become apparent during the ensuing description of a preferred embodiment thereof, such description being given in conjunction with the accompanying drawings illustrative thereof wherein:

FIG. 1 is an isometric view of the cooker with only the upper half of the remote food holder being illustrated, and with a still more rudimentary showing of the adjacent food holder or grill basket being shown;

FIG. 2 is an enlarged detail view of an upper front side corner, with hidden details and internal air flow arrows being shown dashed, the view being taken from the plane of the line 2—2 in FIG. 1;

FIG. 3 is a top plan view of the cooker with the food grill baskets removed;

FIG. 4 is a front view of the cooker with the food grill baskets removed;

FIG. 5 is an end view of the cooker with the food grill baskets removed; and,

FIG. 6 is a simplified view of one of the good grill baskets showing the same in an opened condition.

DESCRIPTION OF THE PREFERRED EMBODIMENT

Referring now to the drawings wherein like numerals designate like parts throughout the various views, the reference numeral 10 designates the cooker of this invention generally. The illustrated cooker 10 manifestly is a dual cooker incorporating two cooker or cooking units designated generally at 12 and 14. It is to be understood or appreciated at the outset that the cooking units 12 and 14 are of such character that the cooker can be a monocooker (a single unit), a dual cooker (two chained units) as shown, a triple cooker (three units chained in a series as units 12 and 14), or as a matter of engineering or users choice as many chained units as desired. The manner of chaining units shall become abundantly clear to those of ordinary or very modest skill as the description of the cooker unfolds.

As quite evident, each of the cooker units 12 and 14 are open topped and of generally rectangular configuration, with the cooker 10 being comprised of an impervious horizontal bottom wall 16 that, at its parallel front and rear edges integrally join the lower edges of upstanding vertical front and rear walls 18 and 20, respectively. The bottom wall 16 as well as the front and rear walls are common to both of the cooker units 12 and 14.

At a position intermediate along the lateral extend of the bottom wall 16, the units 12 and 14 share a common partition wall 22 that is vertical and normal to the front and rear walls, such walls 22 being upstanding from the bottom wall 16 to which it is integrally joined and being integrally joined along its front and rear edges to the front and rear walls 16, 18, 20 and 22 are preferably of steel with about 16 gauge being suitable. Each of the aforementioned junctures are continuous and can conveniently be fabricated by welding.

The lateral extremities of the bottom wall 16 and the front and rear walls 18 and 20 terminate in spaced vertical planes parallel to the partition wall, with side or end walls 24 and 26 (similar to the partition wall 22) being coincident with the positions of such planes. The side or end walls 24 and 26 have lower edges integrally joined to the remote lateral edges of the bottom wall, and have forward and rear edges integrally joined to the lateral extremities of the front and rear walls, respectively.

Each of the last mentioned junctures are continuous, and with the side walls also being preferably of steel, such junctures can be conveniently fabricated by conventional welding techniques. The front and rear walls 18 and 20 terminate in horizontal upper edges 28 and 30 of about the same height, with the partition wall 22 and the side walls 24 and 26 having a substantially greater height than the front and rear walls 18, as clearly shown; this last specification being for a purpose to be made clear subsequently.

It will be noted that the partition wall 22 serves as a side wall in conjunction with side wall 24 for the unit 12, while also serving as a side wall in conjunction with the side 26 for the cooker unit 12. The arrangement is such that the units 12 and 14 may be said to be chained together. Manifestly any desired number of cooking units can be chained together with adjoining units being in side by side relationship with each other. Conversely, the cooker 10 can be reduced in length or cut off to such an extend that the partition wall 22 becomes an end or side wall so that the cooker 10 is constituted of only one cooker unit; either unit 12 or 14. Such obvious structural alternatives have been dwelt upon to such rather tedious extend only to those of minimal familiarity with the art.

As thus far described all of the walls 16–26 are impervious, and the units 12 and 14 impervious to such an extent that either of them could hold water up to the level of the upper edges 28 and 30, though of course, such is plainly not the purpose of the structure.

The cooker 10 is fixedly provided with front and rear pairs of support legs 40 and 42 of equal length that depend from the bottom wall 16 so that the cooker 10 may be horizontally supported by ground or patio surfaces.

The cooker 10 includes front and rear air intake hoods designated generally at 50 and 52, respectively. The hoods 50 and 52 are fixed to and extend horizontally along the outer sides of upper marginal portions of the front and rear walls 18 and 20, respectively, as shown.

As the front and rear walls 18 and 20 as well as their respective hoods 50 and 52 are essentially mirror images to each other (related as a left glove to a right glove), a detailed description of the hood 50 and its relationship to the front wall 18 will suffice also for the hood 52.

The hood 50 comprises an upper hood wall 54 integrally joined to the front wall 18 at its upper edge 28 and projects outwardly from the front wall 18 to terminate in an integral depending hood wall 56 that is spaced from the front wall 18 to define a downwardly opening convection air space 58 therebetween that is in free communication with air ambient to the cooker 10 below the lower horizontal edge 60 of the depending hood wall 56.

In relation to unit 12 dimensions set forth subsequently, the hood wall 54 projects outwardly 1½ inches (plus or minus 10%) from the front wall 18. The hood wall 56 depends vertically at least 2½ inches (plus or minus 10%) from the hood wall 54, and may depend therebelow any extent deemed expedient or desirable down to the level of the bottom wall 16.

Both of the lateral extremities of the hoods 50 and 52 are closed by end plates such as those indicated at 70 and 72.

Air communication between an upper portion of the convection air space and the upper interior of the cooker unit 12 is established by air passageway means through the front wall 18 in the form of an elongated horizontal opening or slot 64 of a horizontal length that is about the spacing of the walls 22 and 24. The character of the opening 64 is most clearly shown in connection with the hood 52 in FIG. 1.

As stated above, the openings 64 communicate with the uppermost interior of the cooker unit 12 below a basket presently to be described. The openings 64 are in the form of elongated horizontal slots of extents that may be equal to the width of the unit 12, and which are at least 9½ inches (plus or minus 10%) relative to dimensions presently to be given for the unit 12. The slots 64 are seven-eights inch wide (plus or minus 10%), and are spaced below the upper hood wall 1 inch (plus or minus 10%). In a corresponding manner, similar openings 80

(see FIG. 1) afford communication between the hoods 50 and 52 with the uppermost interior of the cooker unit 14.

An explanation of the function of the hoods 50 and 52 in relation to the front and rear walls 18 and 20 and the slots or openings 64 and 80 is appropriate at this point, such explanation being given in conjunction with the hood 50, front wall 18 and the opening with particular reference to FIG. 2.

Recognizing that the interior of cooker unit 12 will be hot during operation, it will become clear that the outer surface of the front wall 18 will be heated by heat conduction therethrough to a temperature higher than the temperature of ambient air. This results in conductive and convective heating of ambient air in contact with and close to the outer surface of the front wall 18 with consequent local relative reduction of density.

Such reduction of density causes the air affected to rise as indicated by the air flow arrows 86 to enter the bottom of the convection space 58 in the hood 50.

The upwardly moving air in the convection space 58 continues upwardly as indicated by the dashed arrows 88 and thence passes through the opening 64 as indicated by the curved and dashed arrow 90 to enter the cooker unit 12 closely spaced below the upper edge 28 of the front wall 18.

Such air entering the cooker unit 12, though heated a modest degree is substantially cooler that the main body of air within the cooker unit 12 and therefore tends by its locally relatively greater density to descend within the cooker unit 12 as suggested by the downturned arrow 92 in FIG. 2. Such downward movement is important as it will be presently explained that the oxidation zone (the source of heat) is at the bottom of the cooker unit 12 and thus is fed a fresh source of oxygen at a rate sufficient to support efficient oxidation.

The above described convection additionally serves the function of lowering the temperature of the wall 18 so as to reduce the magnitude of any burn hazard to the user.

A wire grill basket such as shown generally at 100 in FIG. 6 is provided for each of the cooker units 12 and 14 of the cooker 10.

The basket 100 is comprised of two identical parts which can be referred to as the upper basket half or part designated generally at 102 in FIG. 6, and a lower basket part or half designated generally at 104 in FIG. 6, such halves or parts 102 and 104 being shown inverted with respect to each other in FIG. 6. As the halves 102 and 104 are identical to each other, a detailed description of the top or upper part or half 102 of the basket 100 will suffice for both.

The basket top 102 is comprised of a pair of parallelly spaced rods or heavy gauge wires 110 and 112 that are connected throughout their lengths by an array of identical connecting rods or sturdy steel wires such as those shown at 116. The wires 116 are normal to the wires 110 and 112 and are fixedly secured thereto in any suitable manner such as by conventional welding techniques. The wires 116 can be of a modest degree of resiliency with flexibiity being enhanced with the wires being bent into inverted V-shaped intermediate their extents as clearly shown at 120 in FIG. 6.

A U-shaped handle 122 of steel rod is fixedly secured in any suitable manner, such as welding, to the central portion of the wire 110, as shown, so that the bight portion 124 of the handle 122 projects normally from the wire 110 in a direction opposite the direction of the wire 112 as clearly shown in FIG. 6.

The basket parts or halves 102 and 104 can be made of stainless steel or be steel heavily plated by conventional techniques with nickel and chromium.

The basket parts on halves 102 and 104 are inverted with respect to each other and hingedly connected together by the wires 112 thereof being closely juxtaposed and loosely encircled at a plurality of spaced positions along their lengths by a plurality of metallic rings such as those shown at 130 in FIG. 6, such rings 130 being interposed between adjacent wires 116 of the basket halves 102 and 104. The rings 130 can be of stainless steel, or plated steel.

The basket grill 100 is such that the handles 122 can be swung apart so that food (hamburgers, steaks, chops, suitable vegetables, or the like), not shown, can be disposed between the halves 102 and 104, after which the handles are moved toward each other to hold the food, normally, the handles can be gripped together in one hand so that the grill basket 100 and its contents can be readily moved about and inverted if desired without displacement or loss of food held thereby.

The dimensions of the grill basket 100 are such as to be substantially coextensive with the open tops of the cooker units, the width being seven-sixteenths inch (plus or minus 10%) less than the spacing of the walls 22 and 24 of the cooker unit 12 and 14, and having a fore and aft extent such that the same can rest on the upper end edges 28 and 30 of the front wall and rear walls 18 and 20, respectively, with the handles 122 projecting forwardly of the hood 50 sufficiently as to be both easily grasped, while being also sufficiently remote from the body of the cooker 10 as to be reasonably cool to the touch. Obviously the basket 100 can actually rest on the hoods 50 and 52, rather than the edges 28 and 30.

In use, the lowermost part of the grill basket 100 is lined throughout its extend with aluminum foil, not shown, which serves two functions, namely, the extremely important function of limiting vertical air flow through the otherwise open top of the cooker unit 12 (when disposed on the latter), and the usual function of preventing the dripping of fluids, moisture, melted fat and the like from dripping into the bottom of the cooker unit 12.

As clearly shown in the drawings and as previously indicated, the walls 22, 24 and 26, which are of identical configuration to each other extend to a substantially greater height than that of the upper edges 28 and 30 of the front and rear walls 18 and 20. Such is clearly shown in FIGS. 1, 2, 4 and 5. Indeed it is preferred that such walls 22, 24 and 26 have heights that at least approach and preferably exceed the heights of the tops of the baskets 100 when the latter are in cooking positions shown thereof in FIG. 1. The walls 22, 24, and 26 should have heights exceeding those of the front and rear walls 18 and 20, or those of the hoods 50 and 52, whichever is greater, by at least an inch. The function of such heights is so that the upper marginal extents of the walls 22, 24 and 26 constitute wind screens facilitating or enabling outdoor use of the cooker 10 under wind conditions that would, in their absence, be impossible.

So as to avoid the hazards of sharp corners, the forward and rearmost upper corners of all the walls 22, 24 and 26 are rounded as shown and as indicated at 140 in FIG. 6 with respect to the forward upper corner of the wall 24.

Dimensions of each of the cooking units 12 and 14 are very important! Preferably, the spacing of the front and rear walls of a unit is 13 inches (plus or minus 10%); the spacing of its side walls is 10½ inches (plus or minus 10%); and the heights of its front and rear walls (hoods if to be greater) is 12 inches (plus or minus 10%). Performance falls off rather sharply when even any one of the stated dimensional ranges is not adhered to quite closely. The lateral extend of a cooker is roughly a multiple of the number of units incorporated therein.

It should be noted at this point that with the aluminum foil positioned in the basket as set forth above, they together constitute a removable common means for well nigh completely closing the open upper end of a cooker unit, and for also supporting food immediately above such closure. Such a combination may be referred to in the claims as "a removable common means for both substantially closing the top of a unit and for supporting food thereon".

In the light of the foregoing, the operation of the invention will be readily understood.

A number of sheets of newspaper, say 12 or so, are wadded up individually and placed scattered about in the bottom of the unit, and then at least one, but preferably at least two or more spaced wads are set on fire by a lighted match in the bottom of the unit 12. Ignition can be effected in a variety of ways subject to choice, and numerous other ways of effecting ignition will readily occur to the ordinary user. Subsequent to having loaded the grill basket 100 with foil and the food to be cooked, the loaded grill basket 100 is closed and then positioned on the cooker unit 12 as shown in FIG. 1.

Heat produced by oxidation of the paper, which is primarily due to flaming, heats the basket and its contents with a minimum loss or waste of heat being carried off by heated air escaping upwardly about the periphery of the foil within the grill basket. Also, very little turbulence of air within the cooker unit is caused in relation to the magnitude of ambient wind, so that heat waste is minimized with the consequence of the production of and realization of sustained high cooking temperatures therein.

As described, very little loss of heated air is induced by any chimney effect, and the supply of air by convection through the hoods 50 and 52 is sufficient to maintain an adequate, but not an excessive and wasteful rate of oxidation.

The cooker 10 does not of necessity have to be emptied of ashes after each use, but should be when the accumulation is such as to impair a subsequent use. While more elaborate provisions of conventional character can be provided to remove ashes, such is not necessary as it is a simple matter to simply turn the cooker 10 upside down, with the grill baskets removed of course, at any location such that the ashes can thereafter be conveniently swept up and placed in a trash receptacle. As the ashes are quite often rather clumped, they can frequently be removed directly from the cooker 10 and placed in a trash receptacle by hand or the use of any suitable lightweight tongs.

Although it is believed preferable to fuel the cooker with newspaper for reasons alluded to previously, the cooker can be fueled, if desired or deemed necessary or expedient, with other fuels in the nature of charcoal, artificial logs of sawdust, newspaper, and the like.

If, for example, charcoal is to be used, it must be burned at a position quite close below the common means previously defined.

This can be readily effected by providing any form of false bottom device that can be removably placed in the unit. A simple tray having support legs, not shown, can be removably placed in the unit to constitute a suitable charcoal support.

Alternatively, though such would most regrettably preclude use of wadded newspaper as a fuel, the unit could simply be fabricated having a height of about half that previously described. Such a unit should have front and rear wall heights less than about 7 inches, preferably less 6 inches.

Conventional techniques would then be applied to ignite the fuel used with modified cooker structure.

In either form of construction (whether for wadded newspaper or charcoal), the combined means previously defined serves to limit the chimney effect to a level of just sufficient draft to sustain combustion without causing objectionable turbulence or heat loss.

Having now fully described the invention as to its use, structure and fabrication, attention is now directed to the appended claims in order to ascertain the actual scope of the invention.

I claim:

1. A cooker comprising an open-topped housing of a generally rectangular parallelopiped configuration defined by a bottom wall, upstanding spaced side walls, and spaced upstanding front and rear walls, front and rear hoods fixed to upper marginal portions of the front and rear walls at the outer faces thereof, air passageway means through the upper marginal portions of the front and rear walls and opening to the interiors of the hoods in an arrangement such that ambient air entering the hoods can move by convection to enter the uppermost interior of the housing, said hoods being elongated horizontally and including a depending hood wall spaced outwardly from the respective front and rear walls to which they are fixed to define spaces therebetween, said hood walls having lower horizontal edges, with said air passageway means comprising elongated horizontal slots in the front and rear walls at heights greater than the heights of the lower edges of the hood walls, an upper hood wall bridging the space between the upper edge of the depending hood wall and the front and rear wall and a common means removably supported on the housing for substantially closing the open upper end of the housing and for supporting food to be cooked.

2. A cooker comprising an open-topped housing of a generally rectangular parallelopiped configuration defined by a bottom wall, upstanding spaced side walls, and spaced upstanding front and rear walls, front and rear hoods fixed to upper marginal portions of the front and rear walls at the outer faces thereof, air passageway means through the upper marginal portions of the front and rear walls and opening to the interior of the hoods in an arrangement such that ambient air entering the hoods can move by convection to enter the uppermost interior of the housing, a common means removably supported on the housing for substantially closing the open upper end of the housing and for supporting food to be cooked, and a pair of the upstanding walls that are diametrically opposed to each other having heights greater than the other upstanding walls such that the upper marginal portions of such walls constitute wind shields affording a significant degree of wind shelter for said common means.

3. The combination of claim 2, wherein said other walls have heights of about 12 inches, and wherein the diametrically opposed walls have heights at least 1 inch greater than that of said other wall.

4. An open-topped, generally rectangular cooker comprising a housing constituted of a horizontal and imperforate bottom wall having parallel front and rear edges, vertical front and rear walls integral with and extending upwardly from the front and rear edges of the bottom wall, said front and rear walls being of substantially equal height and having horizontal upper edges, parallelly spaced vertical side walls integral with and extending upwardly from the bottom wall, said side walls being normal to and having front and rear vertical edges respectively integral with the front and rear walls, respectively, each of said side walls being imperforate and having a height substantially greater than the front and rear walls, front and rear air intake hoods fixed to and extending horizontally along outer sides of the upper marginal portions of the front and rear walls, each of said hoods being comprised of an upper hood wall integral with and projecting outwardly from its respective housing wall, with the upper hood wall terminating in a depending hood wall that is spaced from its respective housing wall to define a convection air space therebetween, said air space being closed at its top by the upper hood wall and having free communication with air ambient to the cooker at its bottom, each of said air spaces having air communication with an upper interior portion of the cooker by an air passageway means extending through its respective housing wall at a height greater than the lowermost extent of the depending hood wall, the arrangement being such that when the interior of the cooker is hot, air will flow upward by convection along the outside of the heated front and rear walls to enter the front and rear hoods, and thence enter the cooker through the passageway means to thereafter descend by convection within the cooker, and said upper edges of the front and rear walls being adapted to support a food support structure, with upper marginal portions of the side walls functioning as wind shields therefor.

5. The combination of claim 4, wherein the front and rear walls have heights of 13 inches, plus or minus 10%.

6. The combination of claim 5, wherein the housing has a width of 10½ inches, plus or minus 10%.

7. The combination of claim 5, wherein the passageway means is an elongated horizontal slot having a vertical width of about seven-eights inch.

8. The combination of claim 6, wherein the side walls have heights at least 1 inch greater than those of the front and rear walls.

9. The combination of claim 4, wherein the front and rear walls have heights of less than about 6 inches.

10. The combination of claim 4 together with a food support structure comprised of a pair of hingedly connected open wire grills that are each provided with a handle remote from and projecting on outwardly from its hinged connection, the arrangement being such that food may be disposed between the grills and held therebetween when the handles are hingedly moved toward each other into positions that are juxtaposed to each other, and said food support structure being removably supported on the front and rear walls between the side walls, with the juxtaposed handles projecting horizontally from above the front hood.

11. An open-topped, generally rectangular cooker comprising a housing constituted of a horizontal and imperforate bottom wall having parallel front and rear edges, vertical front and rear walls integral with and extending upwardly from the front and rear edges of the bottom wall, said front and rear walls being of substantially equal height and having horizontal upper edges, parallelly spaced vertical side walls integral with and extending upwardly from the bottom wall, said side walls being normal to and having front and rear vertical edges respectively integral with the front and rear walls, respectively, each of said side walls being imperforate and having heights at least as great as those of the front and rear walls, front and rear air intake hoods fixed to and extending horizontally along outer sides of the upper marginal portions of the front and rear walls, each of said hoods being comprised of an upper hood wall integral with and projecting outwardly from its respective housing wall, with the upper hood wall terminating in a depending hood wall that is spaced from its respective housing wall to define a convection air space therebetween, said air space being closed at its top by the upper hood wall and having free communication with air ambient to the cooker at its bottom, each of said air spaces having air communication with an upper interior portion of the cooker by an air passageway means extending through its respective housing wall at a height greater than the lowermost extent of the depending hood wall, the arrangement being such that when the interior of the cooker is hot, air will flow upward by convection along the outside of the heated front and rear walls to enter the front and rear hoods, and thence enter the cooker through the passageway means to thereafter descend by convection within the cooker, and said upper edges of the front and rear walls being adapted to support a food support structure, with upper marginal portions of the side walls functioning as wind shields therefor.

12. The combination of claim 11 together with a food support structure comprised of a pair of hingedly connected open wire grills that are each provided with a handle remote from and projecting on outwardly from its hinged connection, the arrangement being such that food may be disposed between the grills and held therebetween when the handles are hingedly moved toward each other into positions that are juxtaposed to each other, said food support structure being removably supported on the front and rear walls between the side walls, with the juxtaposed handles projecting horizontally from above the front hood.

* * * * *